US011372132B2

(12) United States Patent
Myers et al.

(10) Patent No.: US 11,372,132 B2
(45) Date of Patent: Jun. 28, 2022

(54) HYPER-LOCALIZED WEATHER/ENVIRONMENTAL DATA

(71) Applicant: LOCATOR IP, L.P., State College, PA (US)

(72) Inventors: Joel N. Myers, State College, PA (US); Michael R. Root, Edmond, OK (US)

(73) Assignee: Locator IP, L.P., State College, PA (US)

( * ) Notice: Subject to any disclaimer, the term of this patent is extended or adjusted under 35 U.S.C. 154(b) by 502 days.

(21) Appl. No.: 15/274,566

(22) Filed: Sep. 23, 2016

(65) Prior Publication Data
US 2017/0090070 A1 Mar. 30, 2017

Related U.S. Application Data

(60) Provisional application No. 62/232,200, filed on Sep. 24, 2015.

(51) Int. Cl.
*G01W 1/10* (2006.01)
*G01W 1/08* (2006.01)

(52) U.S. Cl.
CPC ............... *G01W 1/10* (2013.01); *G01W 1/08* (2013.01); *G01W 2203/00* (2013.01)

(58) Field of Classification Search
CPC . G01W 1/10; G01W 1/08; G01V 3/15; A63B 24/0021
See application file for complete search history.

(56) References Cited

U.S. PATENT DOCUMENTS

| 5,193,143 | A | | 3/1993 | Kaemmerer |
| 5,488,697 | A | | 1/1996 | Kaemmerer |
| 6,054,950 | A | | 4/2000 | Fontana |
| 6,124,862 | A | * | 9/2000 | Boyken ................. G06T 15/205 345/419 |
| 6,133,853 | A | | 10/2000 | Obradovich et al. |
| 6,144,739 | A | | 11/2000 | Witt et al. |
| 6,181,260 | B1 | | 1/2001 | Simon et al. |

(Continued)

FOREIGN PATENT DOCUMENTS

| CA | 2 418 268 A1 | 1/2002 |
| JP | 06508964 | 10/1994 |

(Continued)

OTHER PUBLICATIONS

Lawrence Livermore National Laboratory, About LLNL Weather, Jan. 16, 2011 (Year: 2011).*

(Continued)

*Primary Examiner* — Kyle R Quigley
(74) *Attorney, Agent, or Firm* — Perkins Coie LLP

(57) ABSTRACT

A system and method for outputting analysis regarding weather and/or environmental conditions at a venue for an event by determining correlations between the results of past events and historical weather and/or environmental conditions, determining current and/or forecasted weather and/or environmental conditions (for example, using a dense mesonet of sensors in and around an event/venue), and generating analysis based on the current and/or forecasted weather and/or environmental conditions and the correlations between the results of past events and the historical weather and/or environmental conditions.

15 Claims, 10 Drawing Sheets

(56) References Cited

U.S. PATENT DOCUMENTS

| | | | |
|---|---|---|---|
| 6,231,519 B1 | 5/2001 | Blants et al. | |
| 6,380,869 B1 | 4/2002 | Simon et al. | |
| 6,497,367 B2 | 12/2002 | Conzola et al. | |
| 6,519,571 B1 | 2/2003 | Guheen | |
| 6,526,335 B1 | 2/2003 | Treyz | |
| 6,535,817 B1* | 3/2003 | Krishnamurti | G01W 1/10 |
| | | | 702/3 |
| 6,671,390 B1* | 12/2003 | Barbour | A63B 24/0021 |
| | | | 348/157 |
| 6,678,700 B1 | 1/2004 | Moore et al. | |
| 6,708,211 B1 | 3/2004 | Tingley et al. | |
| 6,823,344 B1 | 11/2004 | Isensee et al. | |
| 7,321,305 B2 | 1/2008 | Gollu | |
| 7,716,077 B1 | 5/2010 | Mikurak | |
| 9,392,460 B1 | 7/2016 | Blake et al. | |
| 2001/0045886 A1 | 11/2001 | Minowa | |
| 2003/0043073 A1 | 3/2003 | Gray | |
| 2003/0107490 A1 | 6/2003 | Sznaider et al. | |
| 2004/0105573 A1* | 6/2004 | Neumann | G06T 17/00 |
| | | | 382/103 |
| 2004/0167813 A1 | 8/2004 | Robertson et al. | |
| 2005/0001720 A1 | 1/2005 | Mason | |
| 2005/0021666 A1 | 1/2005 | Dinnage et al. | |
| 2005/0136949 A1 | 6/2005 | Barnes, Jr. | |
| 2006/0187017 A1 | 8/2006 | Kulesz et al. | |
| 2006/0265238 A1 | 11/2006 | Perrier et al. | |
| 2007/0050128 A1 | 3/2007 | Lee et al. | |
| 2007/0152157 A1* | 7/2007 | Page | G06K 9/3216 |
| | | | 250/340 |
| 2008/0270030 A1* | 10/2008 | Copley | G01W 1/02 |
| | | | 702/3 |
| 2009/0046152 A1* | 2/2009 | Aman | G06K 9/3216 |
| | | | 348/157 |
| 2009/0262137 A1* | 10/2009 | Walker | H04H 60/04 |
| | | | 345/629 |
| 2009/0287587 A1 | 11/2009 | Bloebaum | |
| 2010/0026809 A1* | 2/2010 | Curry | H04N 5/232935 |
| | | | 348/157 |
| 2011/0128144 A1 | 6/2011 | Baron et al. | |
| 2012/0173075 A1 | 7/2012 | Mays | |
| 2013/0080055 A1 | 3/2013 | Speier et al. | |
| 2013/0085673 A1 | 4/2013 | Cavalcante et al. | |
| 2013/0091452 A1 | 4/2013 | Sorden | |
| 2013/0057551 A1 | 12/2013 | Ebert et al. | |
| 2014/0236331 A1* | 8/2014 | Lehmann | G09B 19/0038 |
| | | | 700/93 |
| 2015/0131845 A1* | 5/2015 | Forouhar | G06F 16/71 |
| | | | 382/100 |
| 2015/0182843 A1 | 7/2015 | Esposito | |
| 2015/0186538 A1 | 7/2015 | Yan | |
| 2015/0212236 A1* | 7/2015 | Haas | G06T 7/337 |
| | | | 382/100 |
| 2015/0297949 A1* | 10/2015 | Aman | G06T 7/246 |
| | | | 348/157 |
| 2016/0012682 A1* | 1/2016 | Strause | G07F 17/3288 |
| | | | 463/28 |
| 2016/0375340 A1* | 12/2016 | Monari | G06F 3/147 |
| | | | 345/474 |

FOREIGN PATENT DOCUMENTS

| | | |
|---|---|---|
| JP | 2002324075 A | 11/2002 |
| JP | 2003187371 A | 7/2003 |
| KR | 20140100173 A | 8/2014 |
| WO | WO 0221864 | 3/2002 |
| WO | WO 2006/094086 A3 | 9/2006 |
| WO | WO 2014/161078 A1 | 10/2014 |
| WO | WO-2017053808 A1 | 3/2017 |

OTHER PUBLICATIONS

Hahn, F., Pablo, M. and Reyes, J. (2014) Solar Driven Wind Speed Monitoring System Using Wireless or Wired Sensors, Energy and Power Engineering, 6, 213-221 (Year: 2014).*

Search Report for PCT/US2016/053456 dated Jan. 5, 2017.

Mcnamee, Ethical Issues Arising From the Real Time Tracking and Monitoring of People Using GPS-Based Location Services.

Singapore Written Opinion dated Sep. 3, 2019; Singapore Application No. 11201802462X; Filling Date: Sep. 23, 2016; 6 pages.

* cited by examiner

HYPER-LOCALIZED WEATHER/ENVIRONMENTAL DATA

CROSS REFERENCE TO RELATED APPLICATIONS

This application claims priority to U.S. Provisional Patent Application No. 62/232,200, filed Sep. 24, 2015, the entire contents of which is hereby incorporated by reference.

BACKGROUND

Weather and environmental conditions can have a significant impact on outdoor events such as sporting events, concerts, etc. Spectators and event participants are typically apprised of weather conditions, such as temperature and wind speed/direction that are generally applicable for an entire event. Similarly, spectators and participants of motor sports are generally apprised of the track conditions that are generally applicable to the entire course. The generally-applicable weather conditions are currently gathered by simply looking at the observed weather conditions for the entire region where the event is taking place or by using information from a single weather sensor that can measure one parameter such as current temperature. Spectators and participants then assume, incorrectly, that the weather condition measured by the single weather sensor is constant across the entire playing surface.

Professional sports teams are constantly searching for an additional marginal benefit over the competition. Professional teams use data analytics to identify undervalued assets and underutilized strategies. NASCAR pit crews even hire former college athletes to reduce pit stop times by fractions of a second. Professional teams may find value in the granular details of the weather and/or environmental conditions at the event, which may vary greatly across the playing surface and/or venue. Additionally, those granular details may be of interest to spectators at the event or watching the event through a televised broadcast.

Accordingly, there is a need for a system that receives, determines, and outputs information regarding the weather and/or environmental conditions for events in more granular detail than is currently available.

SUMMARY

Until now, sporting events have not incorporated any type of densely-spaced, weather and/or environmental sensor array or network. By contrast, the system described herein includes a dense mesonet of weather and/or environmental sensors in and around an event and/or venue. In some embodiments, the dense array of weather and/or environmental sensors may be mounted directly on the ground, elevated on towers at a single or multiple levels, and/or placed on moving vehicles (such as drones) to allow for measurements to be taken at different locations at different times during the event.

Additionally, the system determines correlations between the results of past events and past weather and/or environmental conditions and outputs analysis based on current and/or forecasted weather and/or environmental conditions and the results of past events with the same or similar weather and/or environmental conditions.

Additionally, prior art systems are only capable of identifying weather and/or environmental conditions that are generally-applicable to an entire event and/or venue. By contrast, the sensor array of the system described herein forms a dense mesonet that can detect and identify changing weather and/or environmental conditions that are only detectable in certain locations of the event and/or venue. While prior art systems simply receive and output weather and/or environmental condition information from a single sensor, the system described herein is able to collect, synthesize, and interpolate weather and/or environmental condition information from a plurality of weather and/or environmental sensors. Finally, the system described herein can use the information from the weather and/or environmental sensors and models of the playing surface and/or venue as well as mathematical models of the atmosphere to determine current and forecasted weather and/or environmental conditions.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DESCRIPTION

Figure 1:
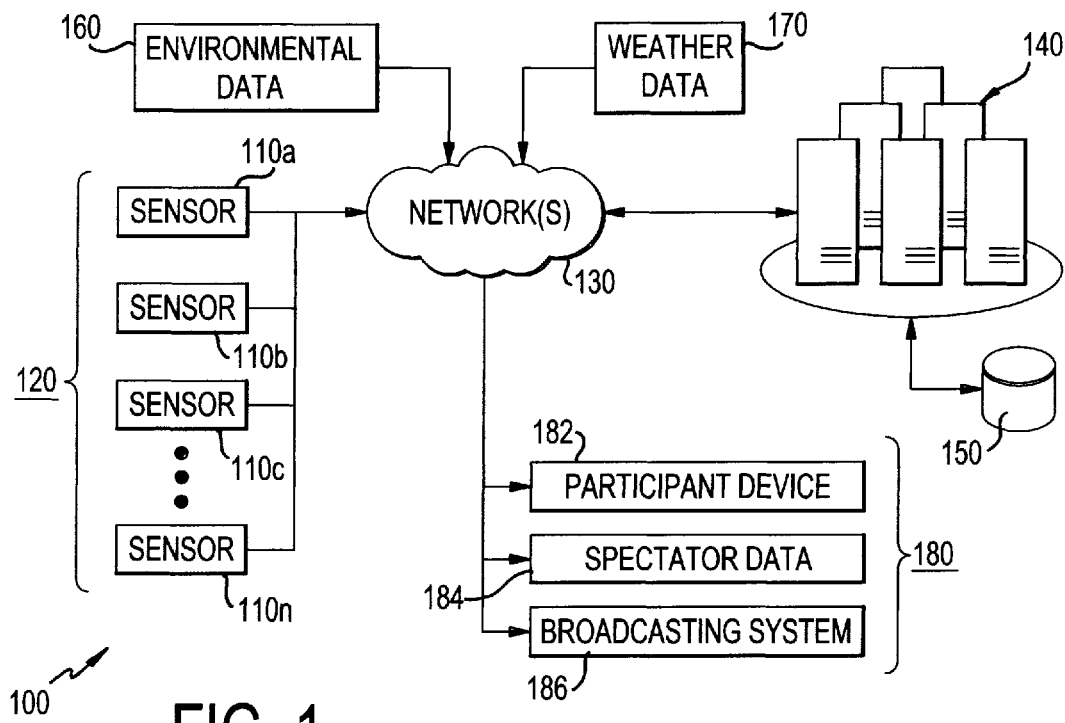
FIG. 1 is a block diagram illustrating an architecture of a hyper-localized weather and environmental system according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram illustrating an architecture 100 of a hyper-localized weather and environmental system according to an exemplary embodiment of the present invention. As shown in FIG. 1, the architecture 100 includes a two- or three-dimensional sensor array 120 that communicates with one or more servers 140 and one or more storage devices 150 via one or more networks 130. As described in detail below, the system is configured to output hyper-localized weather and/or environmental data to remote devices 180, such as participant devices 182, spectator devices 184, and/or a broadcasting system 186.

The one or more servers 140 may include any suitable computing device that executes instructions to perform the functions described herein. The one or more servers 140 may include internal storage and one or more computer processors. The one or more storage devices 150 may also include a non-transitory computer readable storage medium, such as a hard disk, solid-state memory, etc. The one or more servers 140 and/or the one or more storage devices 150 may be located at the event venue or may be remotely located (i.e., cloud-based). The network(s) 130 may include one or more short- or long-range data connections that enable the one or more servers 140 to receive and store information output by the weather and/or environmental sensors 110. The network(s) 130 may include one or more local area networks or wide area networks (e.g., the internet). The network(s) 130 may include wired and/or wireless data connections.

The one or more servers 140 may receive historical and/or current environmental data 160 and/or weather data 170. The environmental data 160 and/or weather data 170 may be received from third parties such as AccuWeather Enterprise Solutions, Inc., governmental agencies (e.g., the U.S. Environmental Protection Agency (EPA), the National Weather Service (NWS), the National Hurricane Center (NHC), Environment Canada, the U.K. Meteorologic Service, the Japan Meteorological Agency, etc.), other private companies (e.g., Vaisalia's U.S. National Lightning Detection Network, Weather Decision Technologies, Inc.), individuals (e.g., members of the Spotter Network), etc.

The sensor array 120 includes weather and/or environmental sensors 110*a*, 110*b*, 110*c*, etc. (referred to herein as "weather and/or environmental sensors 110") in and around the playing surface and/or venue of an outdoor public event. Each weather and/or environmental sensor 110 collects and outputs information indicative of the weather and/or environmental conditions and outputs that weather and/or environmental condition information in real time (or near-real time) to the one or more servers 140. The weather and/or environmental sensors 110 may be suitable devices configured to gather information indicative of temperature, humidity, wind speed and/or direction, solar radiation, particulate matter, hazardous gases, and/or any other weather and/or environmental conditions.

Figure 2:
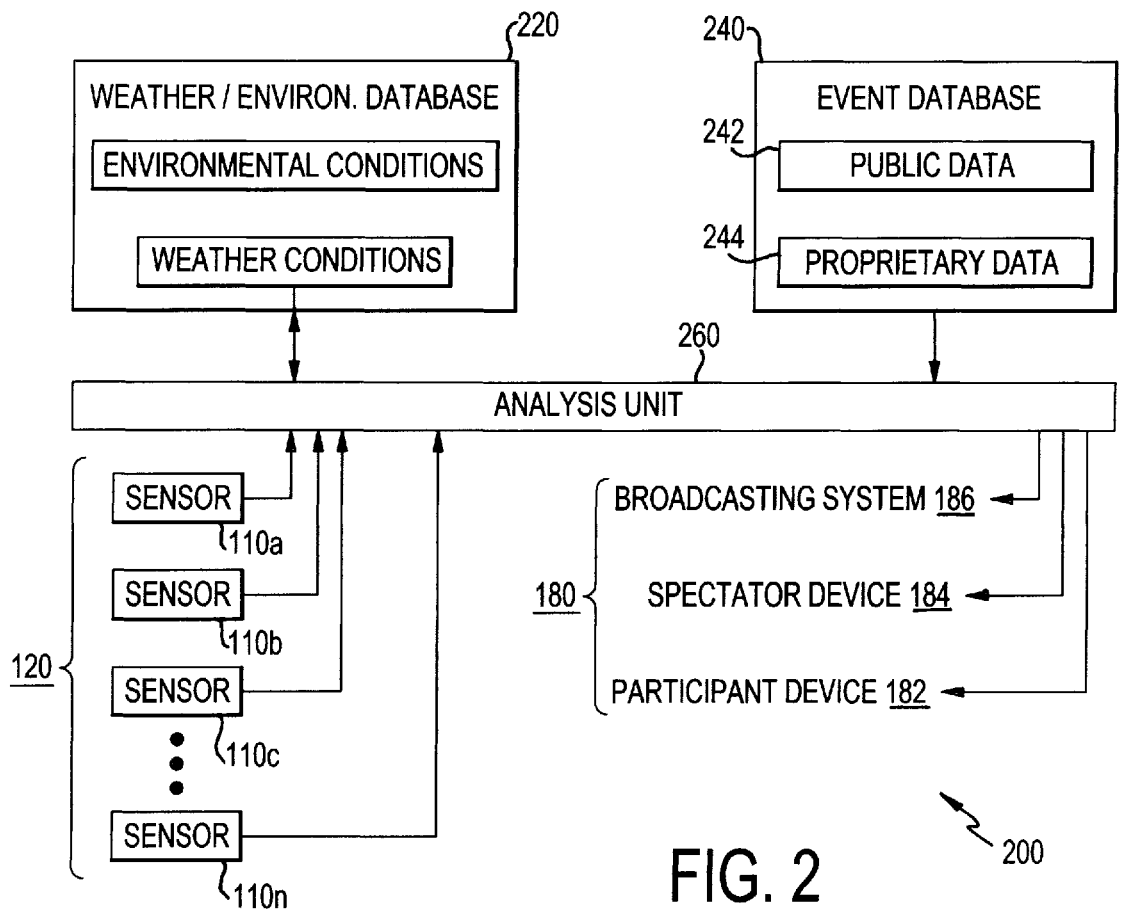
FIG. 2 is a block diagram illustrating the hyper-localized weather and environmental system according to an exemplary embodiment of the present invention.

FIG. 2 is a block diagram illustrating the hyper-localized weather and environmental system 200 according to an exemplary embodiment of the present invention.

As shown in FIG. 2, the system 200 includes the sensor array 120 described above, a weather/environmental database 220, an event database 240, and an analysis unit 260. The weather/environmental database 220 stores environmental data 160 and weather data 170. The event database 240 may store public data 242 and/or private data 244.

The weather/environmental database 220 and the event database 240 may be any organized collection of information, whether stored on a single tangible device or multiple tangible devices. The weather/environmental database 220 and the event database 240 may be stored, for example, in one or more of the storage devices 150. The analysis unit 260 may include any suitable computing device and/or computer executable software instructions that perform the functions described herein.

The analysis unit 260 may be realized by hardware elements, such as the one or more servers 140, and/or software instructions accessible to and executed by the one or more servers 140.

The environmental data 160 may include data regarding historical, current, and/or forecasted environmental conditions at the event venue and at other locations (for example, other locations that hosted similar events). The environmental data 160 may include information indicative of environmental conditions (e.g., pollen levels, particulate matter concentrations, concentrations of various gases, water salinity, turbidity, pH levels, etc.) as well as the locations and times that the environmental condition information was collected. The historical environmental conditions may be received from one or more third parties as described above. Additionally or alternatively, the historical environmental conditions may be determined by the analysis unit 260 based on data received from the sensor array 120 and stored over time in the weather/environmental database 220. Similarly, the current and/or forecasted environmental conditions may be determined by the analysis unit 260 based on data received from the sensor array 120 as discussed below.

The weather data 170 may include data regarding historical, current, and/or forecasted weather conditions at the event venue and at other locations (for example, other locations that hosted similar events). The weather data 170 may include information indicative of weather conditions (e.g., temperature, precipitation, wind speed and direction, solar irradiance, barometric pressure, cloud cover, etc.) as well as the locations and times that the weather condition information was collected. The historical weather conditions may be received from one or more third parties as described above. Additionally or alternatively, the historical weather conditions may be determined by the analysis unit 260 based on data received from the sensor array 120 and stored over time in the weather/environmental database 220. Similarly, the current and/or forecasted weather conditions may be determined by the analysis unit 260 based on data received from the sensor array 120 as discussed below.

The environmental data 160 and the weather data 170 may also include mathematical models of the atmosphere used by the system 200 to forecast environmental and weather conditions.

The public data 242 may include any publicly available information regarding the event venue, event participants, and past events. The information regarding the event venue may include location data, a two- and/or three-dimensional model of the event location, event venue topographic information, a digitized course design and layout, demographic data related to the event or venue location, etc. The information regarding event participants and past events may include past event results, statistics on individual participants and/or team performance, spectator attendance data, spectator demographic data, broadcast viewer statistics, gate receipts, concession sales, internal and external advertising revenues, etc.

The proprietary data 244 may include any proprietary information regarding the regarding the event venue, event participants, and past events. Similar to the public data 242, the information regarding the event venue may include location data, a two- and/or three-dimensional model of the event location, event venue topographic information, a digitized course design and layout, demographic data related to the event or venue location, etc., and the information regarding event participants and past events may include past event results, statistics on individual participants and/or team performance, spectator attendance data, spectator demographic data, broadcast viewer statistics, gate receipts, concession sales, internal and external advertising revenues, etc. Additionally or alternatively, the proprietary data may include information regarding individual and/or team game plans and/or information regarding the promotion and/or advertising of past and/or current events.

The weather and/or environmental sensors 110 may be stacked vertically in order to collect weather and/or environmental condition information above the surface of the event. For example, the weather and/or environmental sensors 110 may be placed on towers and the towers may be distributed in a dense array throughout the venue.

Figure 3:
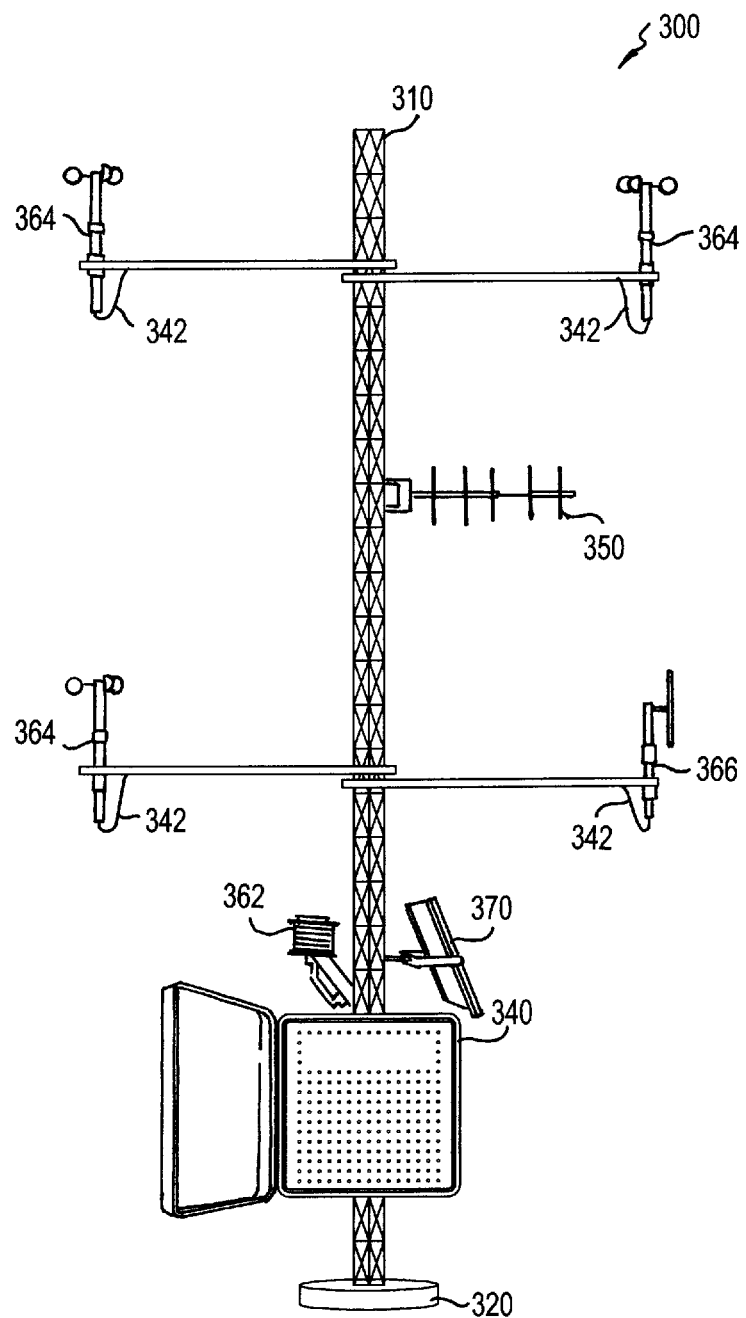
FIG. 3 is a diagram illustrating a tower that includes a plurality of weather and/or environmental sensors at various levels according to an exemplary embodiment of the present invention.

FIG. 3 is a diagram illustrating a tower 300 that includes a plurality of weather and/or environmental sensors 110 at various elevations according to an exemplary embodiment of the present invention.

As shown in FIG. 3, the tower 300 may include a vertical structure 310 supported by a base 320. Each tower 300 may include a data logger 340 that collects information from each of the weather and/or environmental sensors 110 on or around the tower 300 (for example, via wired connections such as coaxial cables 342) and an antenna 350 that transmits the information from each of the sensors 110 to the one or more servers 140. In another embodiment, the weather and/or environmental sensors 110 may output the information directly to the one or more servers 140. In other embodiments, the data logger 340 or the weather and/or environmental sensors 110 may output the information to the one or more servers 140 via one or more wired connections. The tower 300 may include a power source, such as a solar panel 370, to supply power to the data logger 340, the antenna 350, and/or the weather and/or environmental sensors 110. Additionally or alternatively, the tower 300 may receive power from an external source.

The towers 300 in and around the venue may be as much as 30 feet (approximately 10 meters) or more in height. At some event venues, one or more towers 300 may extend up to 180 feet (approximately 60 meters) and may include weather and/or environmental sensors 110 at four or five levels. Each tower 300 may include various weather and/or environmental sensors 110 at ground level and one or more weather and/or environmental sensors 110 at elevations up the tower 300. At or near ground level, for example, the tower 300 may include a temperature and humidity sensor 362, a precipitation sensor, etc. At higher elevations, additional weather and/or environmental sensors 110 may include wind speed sensors 364, wind direction sensors 366, particulate matter (PM) sensors, gas detectors, barometric pressure sensors, temperature sensors, etc. The sensor array 120 may include the same type of weather and/or environmental sensors 110 at multiple elevations so that the analysis unit 260 may determine a three-dimensional perspective on changing atmospheric conditions.

The weather and/or environmental sensors 110 may be stationary and placed at fixed locations along the playing surface and/or venue. Additionally or alternatively, some or all of the weather and/or environmental sensors 110 may be moveable such that an operator may adjust the density of the sensor array 120 at different locations throughout the event. For example, one or more the weather and/or environmental sensors 110 may be mounted on unmanned aerial vehicles (i.e., drones) that include wireless telemetry equipment to allow the weather and/or environmental sensors 110 to be positioned and/or repositioned depending on the needs of the operator. Moveable weather and/or environmental sensors 110 provide a number of benefits. For example, a number of weather and/or environmental sensors 110 may be concentrated in areas with highly variable weather and/or environmental impacts. In another example, a number of weather and/or environmental sensors 110 may be concentrated in areas having greater concentrations of participants and/or spectators.

Figure 4:
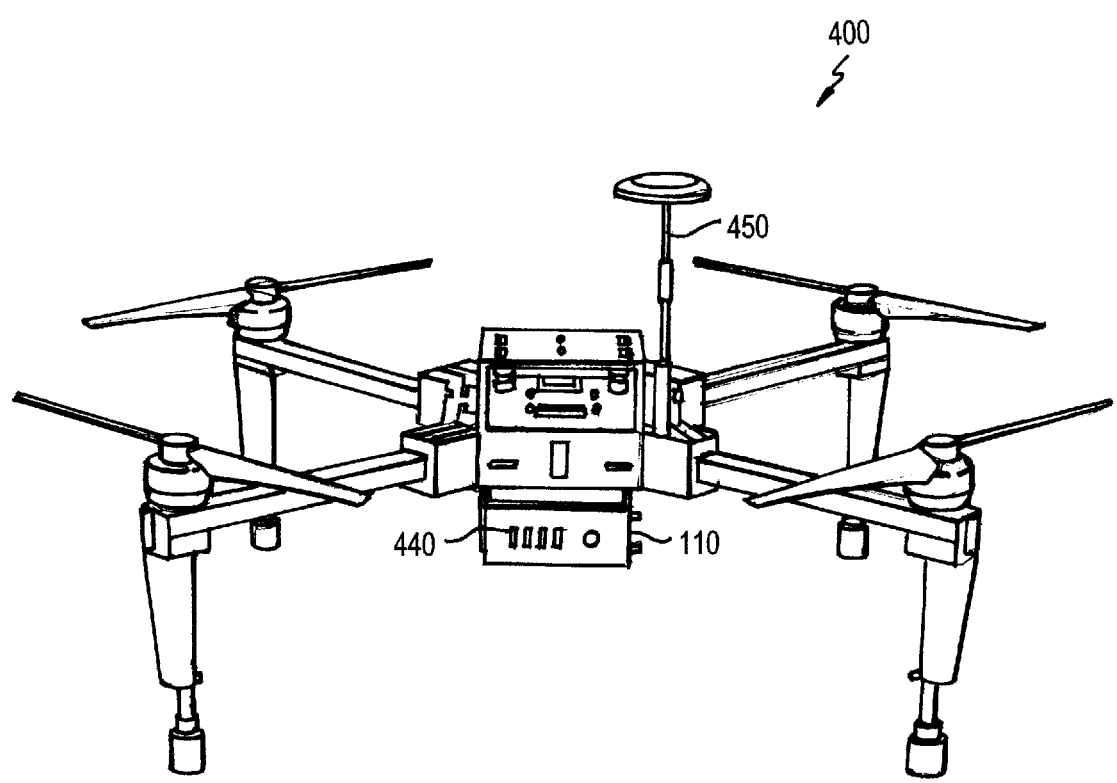
FIG. 4 is a drawing illustrating an unmanned aerial vehicle (i.e., drone) according to an exemplary embodiment of the present invention.

FIG. 4 illustrates an unmanned aerial vehicle 400 according to an exemplary embodiment of the present invention.

As shown in FIG. 4, the unmanned aerial vehicle 400 may include one or more weather and/or environmental sensors 110, a data logger 440 that collects information from the weather and/or environmental sensor(s) 110, and a wireless transmitter 450 that outputs information from the weather and/or environmental sensor(s) 110 to the one or more servers 140.

The system 200 may include any number of weather and/or environmental sensors 110. The number of weather and/or environmental sensors 110 may be based on the type and nature of the event and/or venue. For a NASCAR race with track being 2.5 miles in length, for example, there may be a tower 300 every 100 feet along the track for a total of 132 towers. Additional towers 300 may also be positioned in the infield. In total, the sensor array 120 may include 225-250 towers 300 at a NASCAR track, each including weather and/or environmental sensors 110 at multiple elevation levels. In another example, the sensor array 120 for a ski or snowboard course may include temperature sensors 110 at or near the snow/air surface every 25 feet down and across the course—with 30 foot (10 meter) towers every 75-100 feet down the course on both sides of the course.

Figure 5:
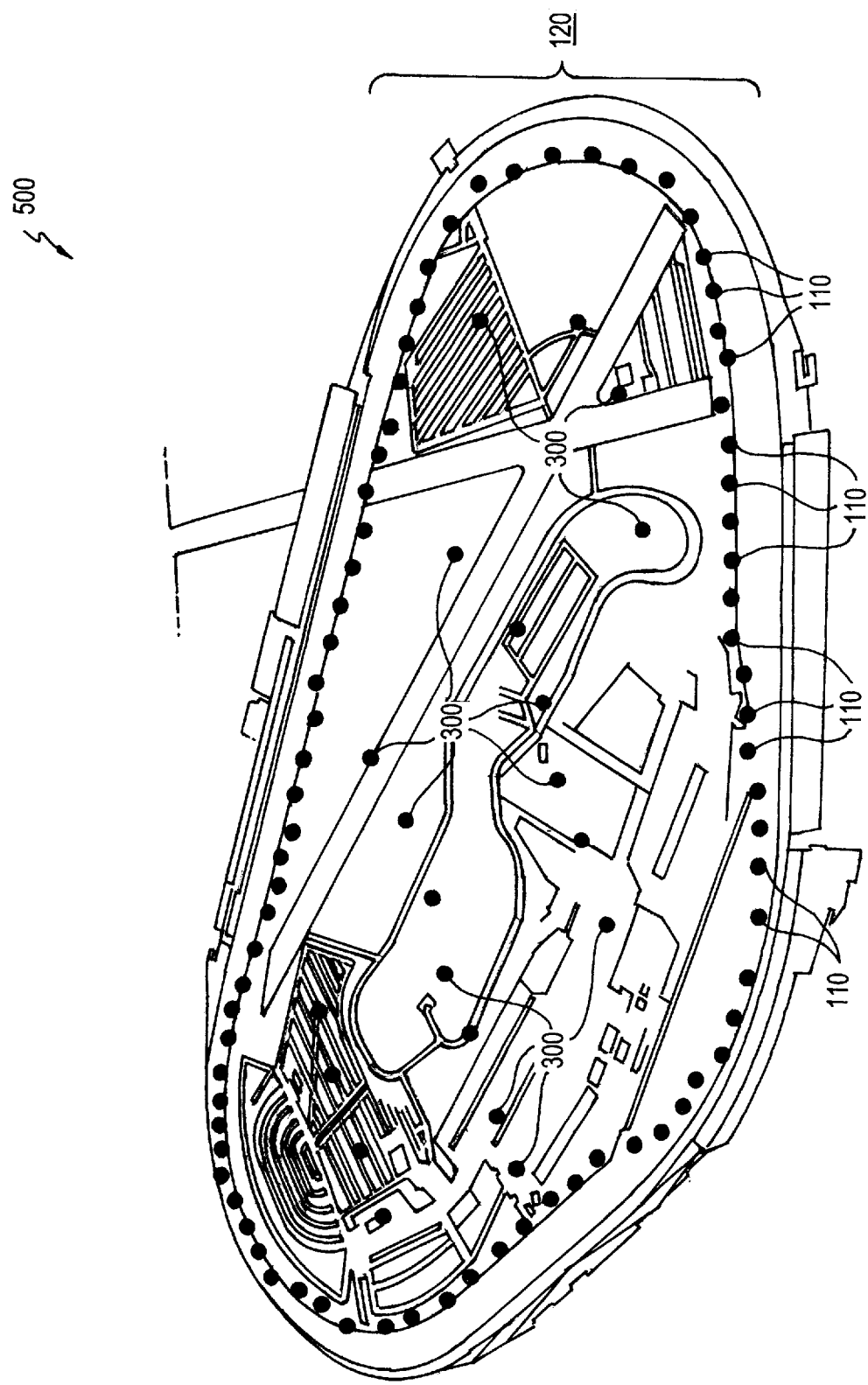
FIG. 5 is a drawing illustrating a sensor array at a venue according to an exemplary embodiment of the present invention.

FIG. 5 illustrates a sensor array 120 at a venue 500 according to an exemplary embodiment of the present invention.

In the example shown in FIG. 4, the venue 500 is the Talladega Motor Speedway. The sensor array 120 may include weather and/or environmental sensors 110 or towers 300 at fixed or varying intervals along the track as well as towers 300 in the infield. As illustrated in FIG. 4 and described in more detail below, the number of weather and/or environmental sensors 110 would be numerous and would allow for the exact geo-location and timing of radically changing weather and/or environmental conditions to be perceived and recorded by the system 200.

Referring back to FIG. 1, each weather and/or environmental sensor 110 may output an identification of the weather and/or environmental condition that the weather and/or environmental sensor 110 is detecting (e.g., temperature), information indicative of the weather and/or environmental condition (e.g., 20 degrees Celsius or 68 degrees Fahrenheit), and the time that the weather and/or environmental condition information was collected to the one or more servers 140. The weather and/or environmental sensors 110, particularly the moveable sensors described above, may also output information indicative of the real-time location of the weather and/or environmental sensor 110. The location of the weather and/or environmental sensor 110 may be a two dimensional location (x,y) on the playing surface or a three-dimensional location (x,y,z) on or above the playing surface. The information indicative of the real-time location of a weather and/or environmental sensor 110 may be determined using a global positioning system, a local device triangulation system, etc. Additionally or alternatively, the system 200 may store the static locations of a weather and/or environmental sensor 110 (for example, in the event database 240).

The analysis unit 260 collects weather and/or environmental condition information from each weather and/or environmental sensor 110 along with the precise location of the weather and/or environmental sensor 110 and the time that the weather and/or environmental condition information was collected. In some embodiments, information received from the weather and/or environmental sensors 110 may be output directly to remote devices 180. In other embodiments, the analysis unit 260 may store a two- or three-dimensional model of the playing surface and/or venue (for example, in event database 240), determine the weather and/or environmental conditions for different locations along the playing surface and/or in the venue based on the model of the playing surface and/or venue and the weather and/or environmental condition information received from two or more of the weather and/or environmental sensors 110. In other embodiments, the analysis unit 260 may store mathematical models of the atmosphere (for example, in the weather/environmental database 220) and determine current and forecasted weather and/or environmental conditions based on the mathematical model of the atmosphere and the weather and/or environmental condition information received from two or more of the weather and/or environmental sensors 110. In addition to the information received from the weather and/or environmental sensors 110, the analysis unit 260 may incorporate environmental data 160 and/or weather data 170 received from third parties (and stored, for example, in the weather/environmental database 220) when determining/forecasting the weather and/or environmental conditions for the playing surface and/or venue.

The analysis unit 260 outputs the information indicative of the weather and/or environmental conditions to the remote devices 180 in textual, audio, and/or graphical format. The remote devices 180 may include participant devices 182 so that event participants (e.g., players, coaches, staff, etc.) may improve, enhance, and otherwise modify their strategy and increase their level of performance during the event based on the dynamic weather and/or environmental conditions. Additionally, event organizers and venues may also use the dynamic and/or forecasted weather and/or environmental conditions provided by the system 200 to increase spectator safety by either postponing the event or resolving a dangerous environmental condition, such as a dangerously slick portion of an auto racing track. The participant devices 182 may include display screens (e.g., tablets, heads-up displays), audio devices (e.g., earpieces, headsets), etc. Accordingly, the analysis unit 260 may output information indicative of the dynamic and/or forecasted weather and/or environmental conditions, in the form of audio, video, and/or still images, to the visors or windshields or earpieces of racecar drivers, visors or earpieces of football and other players, headphones of coaches, etc.

The remote devices 180 may also include spectator devices 184 to provide an enhanced viewing experience for spectators in the venue. Spectator devices 184 may include video monitors at the venue, wireless devices (e.g., smartphones, tablets, radios) belonging to event spectators, etc. The event venue, for example, may provide information indicative of the dynamic weather and/or environmental conditions in textual, audio, and/or graphical format to spectators that download a mobile phone applications. The information may be provided by the event venue for a fee and/or be supported by advertising.

The remote devices 180 may also include a broadcasting system 186 so that a broadcaster can provide an enhanced viewing experience for viewers of a television broadcast of the event. The system 200 and/or the broadcasting system 186 may overlay information indicative of the dynamic weather and/or environmental conditions over images of the playing surface or venue as shown, for example, in FIGS. 6-10 described below.

Events may include auto races, golf matches, baseball games, football games, basketball games, hockey games, soccer games, Olympic events, etc. While embodiments are described with reference to professional sporting events, the system 200 may also be implemented for semi-pro and amateur (college, high school, etc.) events.

Figure 6:
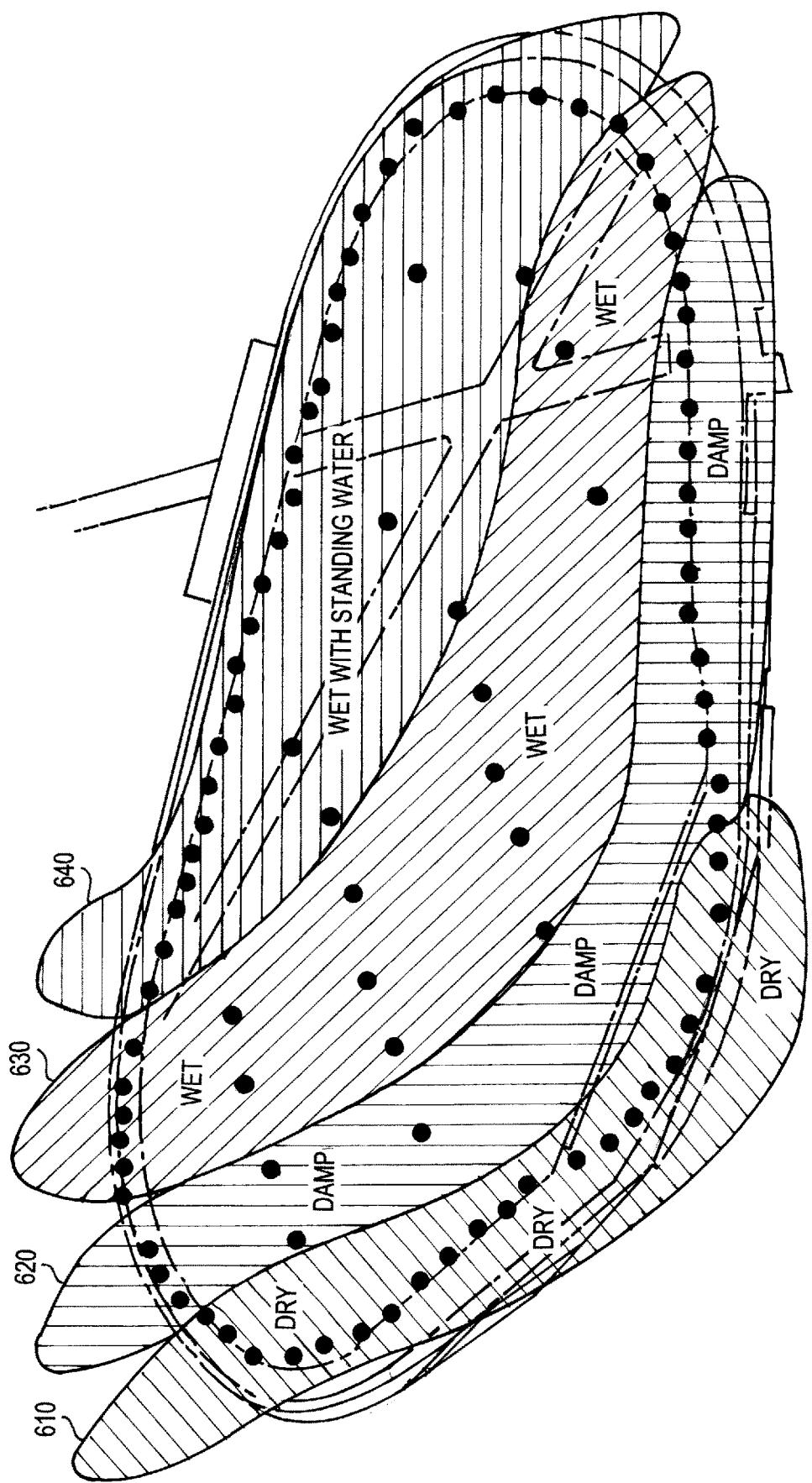
FIGS. 6 through 8 are drawings illustrating information indicative of the weather and/or environmental conditions in the venue as determined and output by the system according to exemplary embodiments of the present invention.
Figure 7:
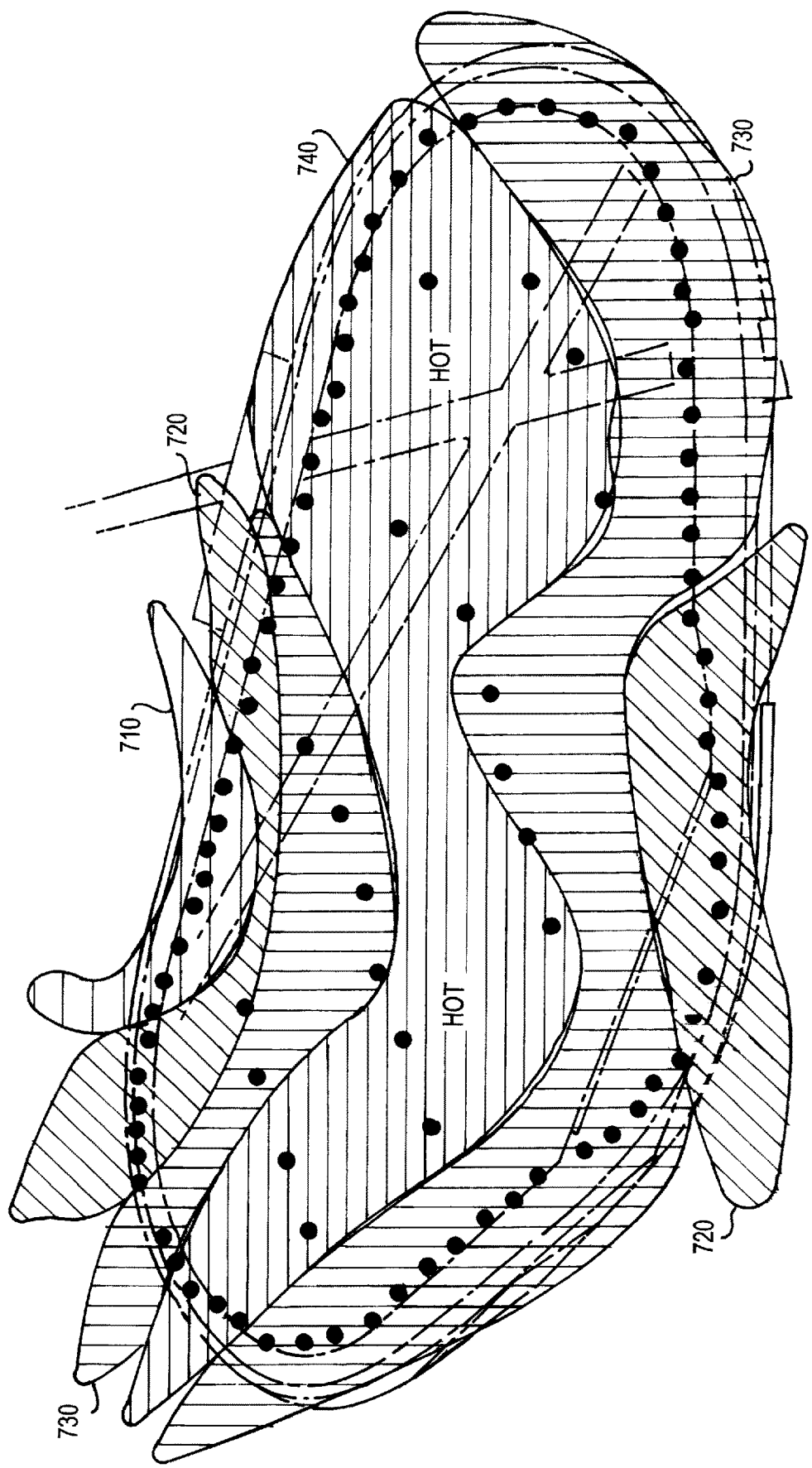
Figure 8:
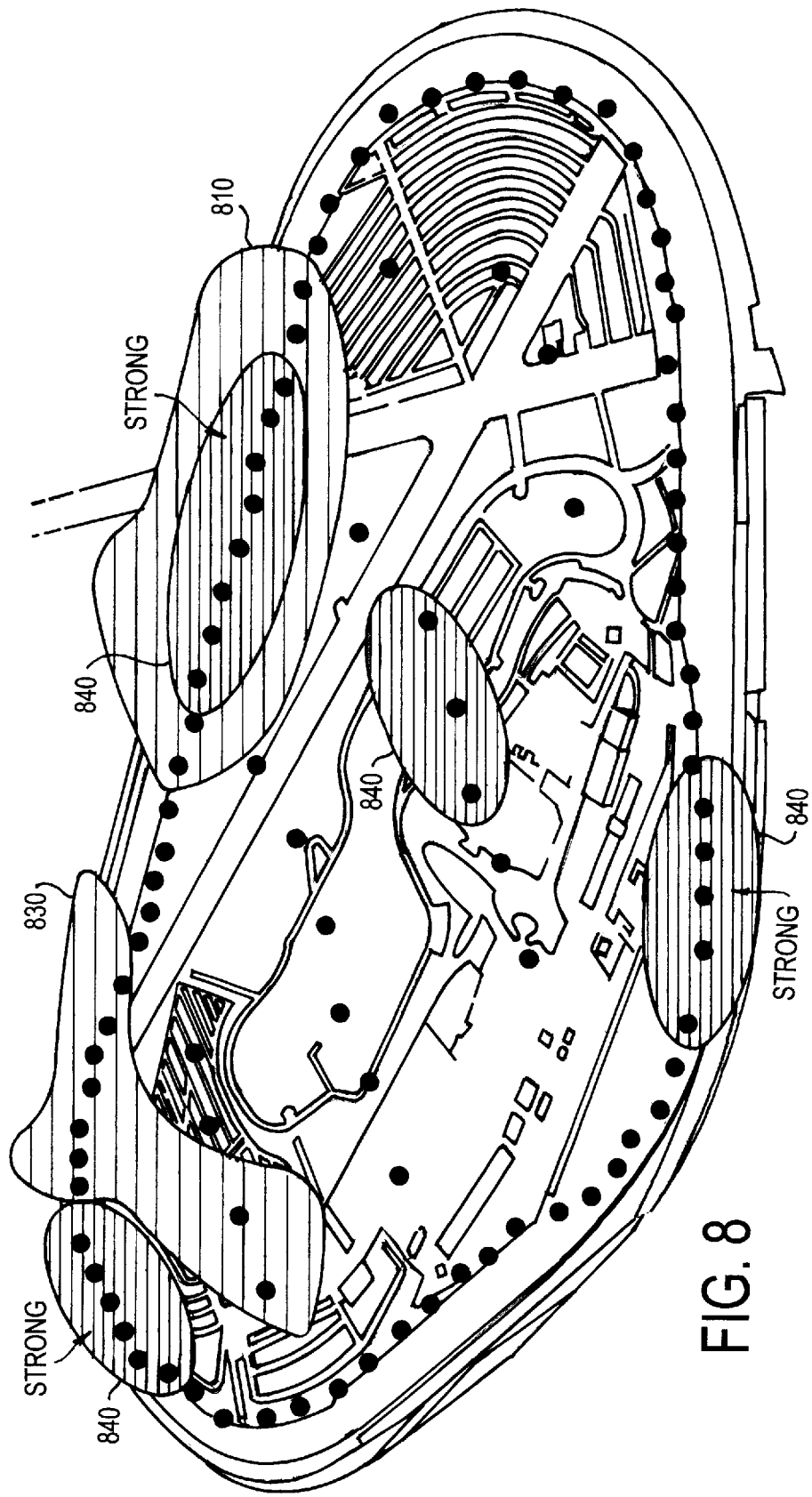

FIGS. 6 through 8 illustrate information indicative of the weather and/or environmental conditions in the venue 500 as determined and output by the system 200 according to exemplary embodiments of the present invention.

As shown in FIG. 6, the system 200 may determine different precipitation amounts in different locations in the venue 500. For example, in region 610, there may be no measurable level of precipitation. In region 620, the precipitation amount may be between a trace amount and 0.1 inches. In region 630, the precipitation amount may be between 0.1 inches and 0.2 inches. And in region 640, the precipitation amount may be greater than 0.2 inches. Based on the precipitation amounts, the system 200 may determine, for example, that the track conditions are dry in region 610, damp in region 620, wet in region 630, and wet with standing water in region 640.

As shown in FIG. 7, the system 200 may determine different surface temperatures in different locations in the venue 500. For example, in region 710, the surface temperature may be less than 94 degrees Fahrenheit. In regions 720, the surface temperature may be between 94 and 98 degrees Fahrenheit. In regions 730, the surface temperature may be between 98 and 102 degrees Fahrenheit. And in region 740, the surface temperature may be above 102 degrees Fahrenheit.

As shown in FIG. 8, the system 200 may determine different wind speeds in different locations in the venue 500. For example, in region 810, maximum wind gusts may be less than 10 miles per hour. In region 830, maximum wind gusts may be between 20 and 30 miles per hour. And in regions 840, maximum wind gusts may be greater than 30 miles per hour.

As shown in FIGS. 6-8, the system 200 generates information that provides value to participants and spectators. Auto racing teams may, for example, use tires that are optimized for the dynamic and/or forecasted weather and/or environmental conditions affecting the track. Rapidly increasing temperatures and/or humidity values after the start of a race may dictate the use of different tires to achieve maximum speed and traction. A similar situation could result if portions of the track (e.g., the turns) were to become wet during the race. By utilizing weather and/or environmental condition information determined by the system 200, drivers and teams may optimize both the tires they select and the timing of pit stops to change the tires.

Figure 9:
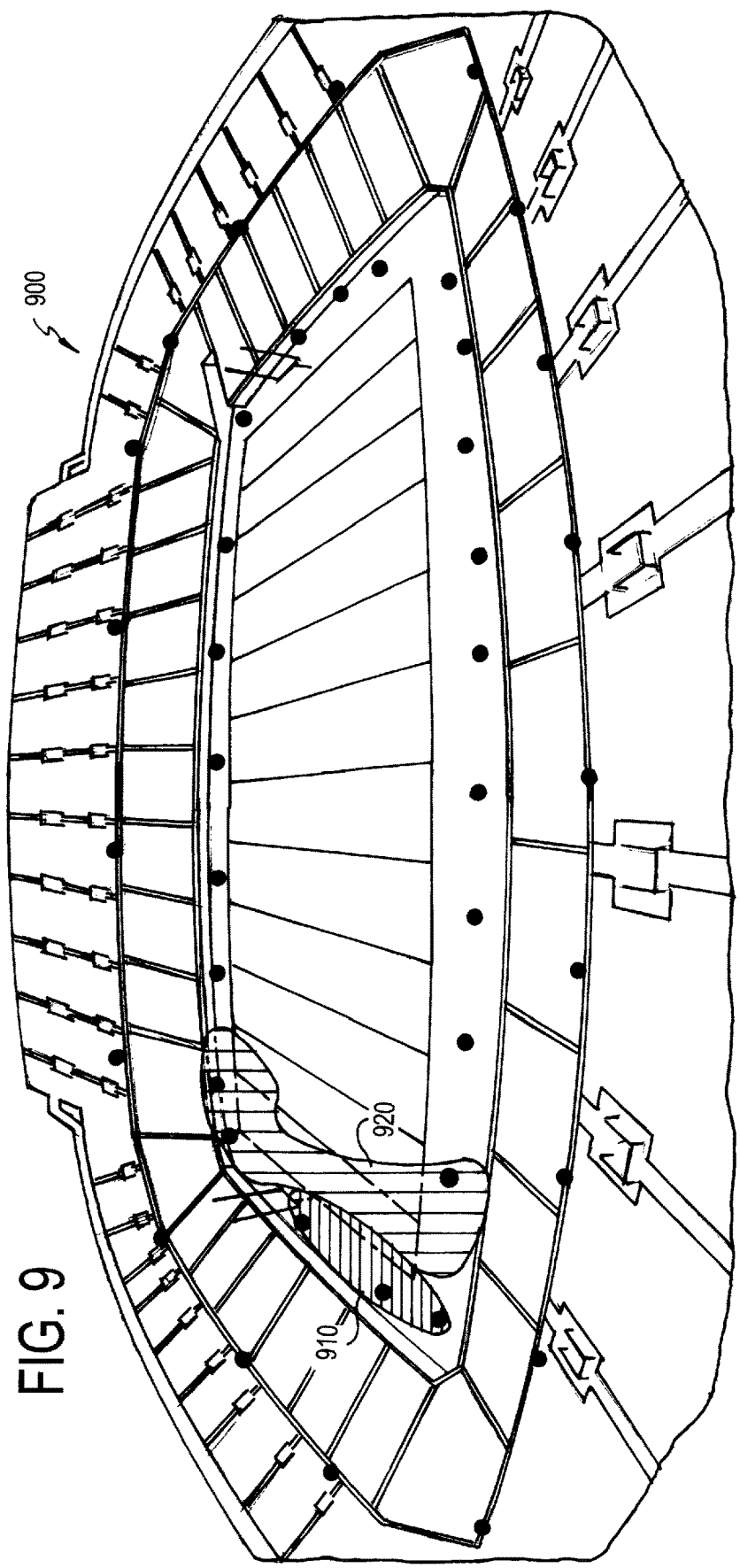
FIG. 9 is a drawing illustrating a sensor array at a venue according to an exemplary embodiment of the present invention.

FIG. 9 illustrates a sensor array 120 at a venue 900 according to another exemplary embodiment of the present invention.

In the example shown in FIG. 9, the venue 900 is the football field at Stanford Stadium. The sensor array 120 may include weather and/or environmental sensors 110 along the sidelines and behind each end zone as well as weather and/or environmental sensors 110 or towers 300 above the playing surface. The system 200 may determine, for example, that region 910 includes wind gusts in excess of 30 miles per hour while region 920 does not include wind gusts in excess of 10 miles per hour.

Utilizing dynamic and/or forecasted weather and/or environmental condition information for individual regions of the playing surface as determined by the system 200, a team may decide to run different plays (e.g., run plays, pass plays, field goal attempts) in different areas of the field. For example, a team may determine that a higher probability of incomplete passes and/or interceptions, missed field goals, etc. may occur in a portion of the field with high winds. If the system 200 is implemented in the venue 900, players and coaches can have the knowledge of where and to what extent the winds are blowing and adjust their plays accordingly. Additionally, spectators in the venue 900 or watching the event on television can better understand how weather and/or environmental conditions are affecting play in different areas of the field.

Figure 10:
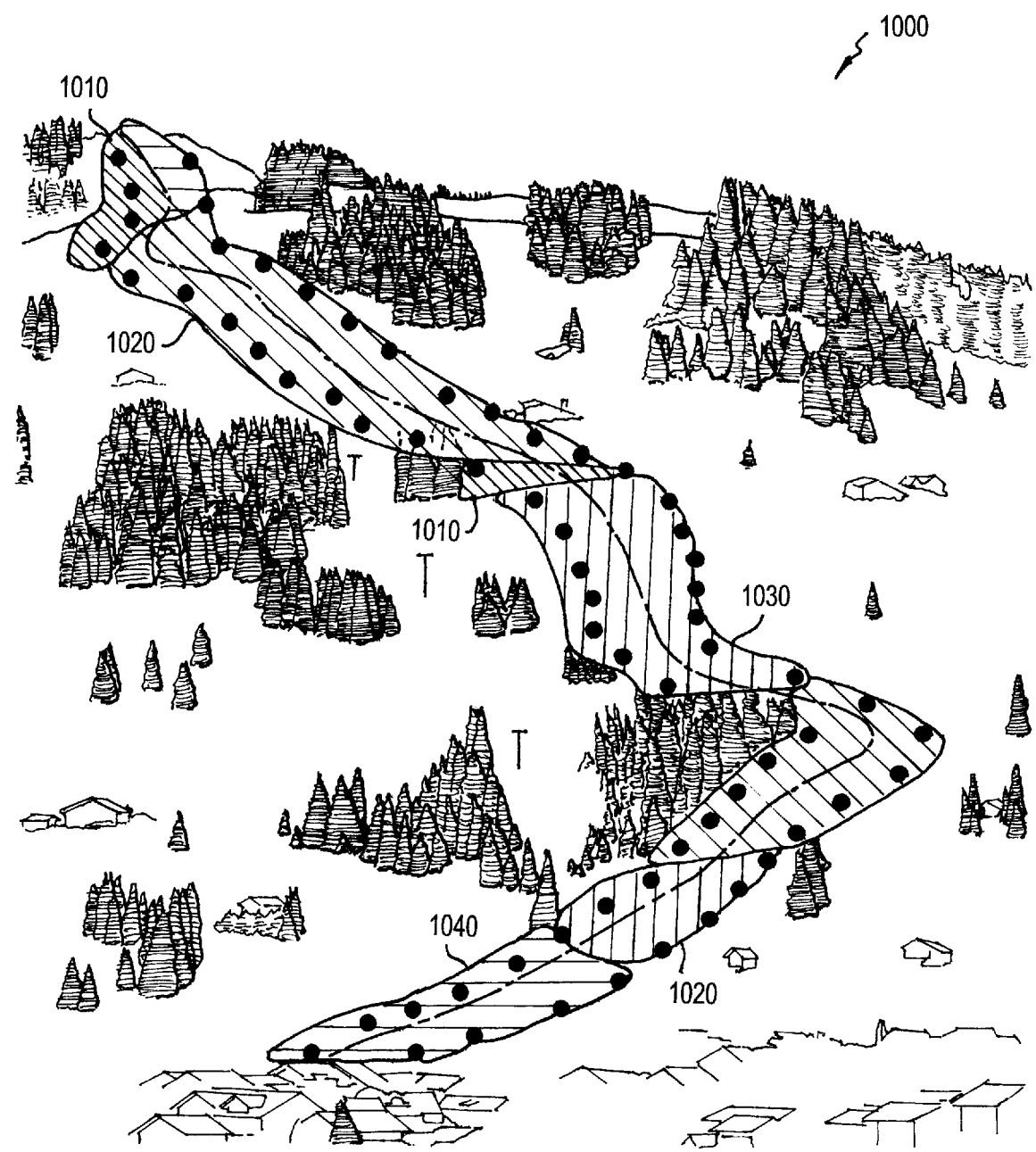
FIG. 10 is a drawing illustrating a sensor array at a venue according to another exemplary embodiment of the present invention.

FIG. 10 illustrates a sensor array 120 at a venue 1000 according to another exemplary embodiment of the present invention.

In the example shown in FIG. 10, the venue 1000 is a downhill ski slope. The sensor array 120 may include, for example, weather and/or environmental sensors 120 that are used by the system 200 to determine the snow surface temperatures along the slope. For example, the system 200 may determine that the snow surface temperatures are less than 30 degrees Fahrenheit in regions 1010, between 30 and 32 degrees Fahrenheit in regions 1020, between 32 and 34 degrees Fahrenheit in region 1030, and above 34 degrees Fahrenheit in region 1040.

In downhill skiing and snowboarding, performance may be a function of the snow conditions. If the temperature of the snow at the venue 1000 is outside of ideal conditions (either too cold or too warm), the performance of the participants may be impacted. If the system 200 is implemented at the venue 1000, participants may utilize the system 200 to determine the current and/or forecasted weather and/or environmental conditions (e.g., snow surface temperature) at various locations to plan the appropriate actions for their skis or snowboards to capitalize on the ideal conditions while counterbalancing the impacts from negative conditions. Additionally, spectators in the venue 1000 or watching the event on television can better understand how weather and/or environmental conditions are affecting the participants at different locations along the slope.

In another example, the venue may be a golf course. In that example, the sensor array 120 may include a weather and/or environmental sensor 110 for every hole. Alternatively, the sensor array 120 may include several weather and/or environmental sensors 110 evenly distributed along every hole. Alternatively, the sensor array 120 may have an uneven distribution of sensors, such as one weather and/or environmental sensor 110 at each tee box, one weather and/or environmental sensor 110 along the fairway on par 3 holes, two weather and/or environmental sensors 110 along the fairways of par 4 and par 5 holes, weather and/or environmental sensors 110 on the approach to the greens, and/or weather and/or environmental sensors 110 around the greens.

In a golf tournament, excessive winds (head-, tail- or crosswinds) can greatly alter the scores of the players. If the system 200 is implemented on a golf course, players and caddies may utilize the system 200 to have a better understanding of which clubs to use on each hole as well as the right game strategy to employ based on the dynamic weather and/or environmental conditions. Additionally, spectators at the event or watching on television can better understand how weather and/or environmental conditions are affecting each shot and each decision.

Referring back to FIG. 3, the analysis unit 260 correlates the historical weather and/or environmental condition information (stored in the weather/environmental database 220) with the historical event information (stored in the event database 240) to determine the relationships between the outcomes of past events and the prevailing weather and/or environmental conditions before, during, and after those events. The outcomes of the past events may include, for example, participant and team performance, spectator attendance, gate and concession sales, broadcast viewership, broadcast revenue, advertising revenue, etc. The analysis unit 260 also determines the current and/or forecasted weather and/or environmental conditions at a venue for an event as described above. Because the current and/or forecasted weather and/or environmental conditions are likely to be the same or similar to some of the historical weather and/or environmental conditions stored in the weather/environmental database 220, the analysis unit 260 is able to provide analysis regarding the outcomes of past events that are correlated with historical weather and/or environmental conditions that are the same or similar to the current and/or forecasted weather and/or environmental conditions.

Using a downhill ski race as an example, the analysis unit 260 may determine an optimal path for a downhill skier based on the current and/or forecasted weather and/or environmental conditions and the outcomes of past events that are correlated with historical weather and/or environmental conditions that are the same or similar to the current and/or forecasted weather and/or environmental conditions. Using that example, the analysis unit 260 may output the optimal path to a participant device 182 so that a skier or coach may view that information. Additionally or alternatively, the analysis unit 260 may output the optimal path to a spectator device 184 or a broadcasting system 186 so that spectators at the venue or watching on television may compare a path of a current skier with the optimal path.

In another example, the analysis unit 260 may determine that one of the downhill skiers is likely to be injured based on the current and/or forecasted weather and/or environmental conditions and the outcomes of past events that are correlated to historical weather and/or environmental conditions that are the same or similar to the current and/or forecasted weather and/or environmental conditions. Using that example, the event organizers may postpone or cancel the event or, if possible, resolve a dangerous condition along the course.

In another example, the analysis unit 260 may determine that television viewership of the event is likely to be low based on the current and/or forecasted weather and/or environmental conditions (e.g., heavy fog impacting visibility) and the outcomes of past events that are correlated to historical weather and/or environmental conditions that are the same or similar to the current and/or forecasted weather and/or environmental conditions. Using that example, the event organizers may postpone or cancel the event or a television broadcaster may find alternate programming.

Figure 11:
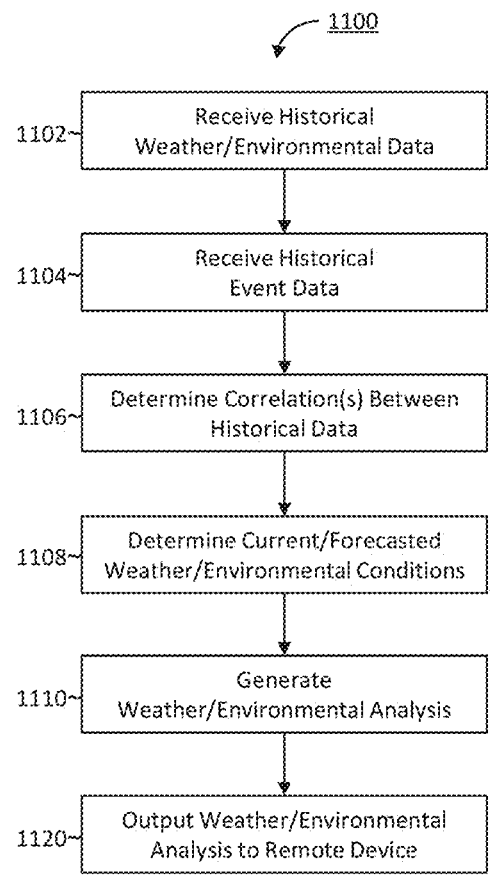
FIG. 11 is a flowchart illustrating a process for generating weather and/or environmental analysis for an event at an event venue according to exemplary embodiments of the present invention.

FIG. 11 is a flowchart illustrating a process 1100 for generating weather and/or environmental analysis for an event at an event venue according to exemplary embodiments of the present invention.

Information regarding historical weather and/or environmental conditions is received in step 1102. The information may be received from third party sources or collected by the system 200 based on data received from the sensor array 120 as described above.

Historical event data is received in step 1104. The historical event data may be public data 242 and/or private data 244 regarding the event venue, the event participants, and/or past events as described above.

The analysis unit 260 determines correlations between the historical event data and the historical weather and/or environmental conditions in step 1106. The correlations may be determined using event data from previous events at the venue and/or similar venues that host similar events. The correlations may be determined using any statistical analysis software and technique. For example, the analysis unit 260 may determine correlations using statistical analysis software package such as SPSS™ Statistics, STATA™, R, and/or SAS™. (SPSS is a registered trademark of International Business Machines Corporation. STATA is a registered trademark of StataCorp, L.P. SAS is a registered trademark of the SAS Institute, Inc.).

The analysis unit 260 determines current and/or forecasted weather and/or environmental conditions at the venue for the event in step 1108. Different values of the same weather and/or environmental condition may be determined by the analysis unit 260 at different locations in the venue as shown, for example, in FIGS. 6-10. A single weather and/or environmental condition at a single location in the venue may be determined by the analysis unit 260 based on data received from two or more of the weather and/or environmental sensors 110. The current and/or forecasted weather and/or environmental conditions may be determined by the analysis unit 260 based on data received from the sensor array 120. Additionally or alternatively, the current and/or forecasted weather and/or environmental conditions may be received by the analysis unit 260 from one or more third parties. The current weather and/or environmental conditions may be determined by the analysis unit 260 using one or more mathematical model of the venue, which may be stored, for example, in the event database 240. The forecasted weather and/or environmental conditions may be determined by the analysis unit 260 using one or more mathematical model of the atmosphere and the server determines the forecasted weather and/or environmental conditions at the locations in the venue further based on the mathematical model of the atmosphere In step 1110, the analysis unit 260 generates weather and/or environmental analysis based on the current and/or forecasted weather and/or environmental conditions and the correlations between the historical event data and the historical weather and/or environmental conditions determined in step 1106. The analysis may include information regarding, for example, participant and/or team performance, spectator attendance, gate and/or concession sales, broadcast viewership, broadcast revenue, advertising revenue, etc.

The analysis unit 260 outputs the analysis generated in step 1110 to a communications network 130 for transmittal to a remote device 180 in step 1120. The remote device 180 may be a participant device 182, a spectator device 184, and/or a broadcasting system 186.

Prior to the development of the present system 200, sporting events have not incorporated any type of densely-spaced, weather and/or environmental sensor array 120 or network. By contrast, the system 200 includes a dense mesonet of weather and/or environmental sensors 100 in and around an event and/or venue. Information from the weather and/or environmental sensors 100—including, in some embodiments, weather and/or environmental sensors 100 mounted on towers 300 and/or drones 400—is sent wirelessly or via wired connections to one or more servers 140 and processed, interpreted, and distributed by the analysis unit 260 to remote devices 180, including participant devices 182, spectator devices 184, and broadcasting system 186 for redistribution to paid/unpaid subscribers.

Additionally, prior art systems are only capable of identifying weather and/or environmental conditions that are generally-applicable to an entire event and/or venue. By contrast, the sensor array 120 of the system 200 forms a dense mesonet that can detect and identify weather and/or environmental conditions that are only detectable in certain locations of the event/venue. Additionally, while prior art systems simply receive and output weather and/or environmental condition information from a single sensor, the system 200 is able to collect, synthesize, and interpolate weather and/or environmental condition information from a plurality of weather and/or environmental sensors 110. Finally, the system 200 can use the information from the weather and/or environmental sensors 110 and models of the playing surface/venue as well as mathematical models of the atmosphere to determine current and forecasted weather and/or environmental conditions.

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

What is claimed is:

1. A system, comprising:
   a weather/environmental database that stores data indicative of past weather and/or environmental conditions;
   an event database that stores data indicative of outcomes of past sporting events,
   a sensor array comprising a plurality of weather and/or environmental sensors at a venue of a sporting event that detect and output data indicative of current weather and/or environmental conditions, wherein at least one of the weather and/or environmental sensors moves based on concentrations of participants and/or spectators, and wherein the at least one moveable-weather and/or environmental sensor that is moveable further outputs information indicative of a real-time spatial location of the weather and/or environmental sensor to the analysis unit; and
   an analysis unit that:
     stores a mathematical model of atmosphere and a three-dimensional mathematical model of a playing surface of the venue;
     determines correlations between the past weather and/or environmental conditions and the outcomes of the past sporting events;
     determines current and/or forecasted weather and/or environmental conditions at locations in the venue based on (i) the data indicative of the current weather and/or environmental conditions, (ii) the mathematical model of the atmosphere, and (iii) and the three-dimensional mathematical model of the playing surface of the venue;
     generates a recommendation for a modification to a play strategy for the sporting event based on the current and/or forecasted weather and/or environmental conditions and the correlations between the past weather and/or environmental conditions and the outcomes of the past sporting events, and
     outputs the recommendation to a communications network for transmittal to a remote device.

2. The system of claim 1, wherein the analysis unit determines at least one current weather or environmental condition at a location in the venue based on data received from two or more of the weather and/or environmental sensors.

3. The system of claim 1, wherein the analysis unit determines different values of a same weather or environmental condition at two different locations in the venue.

4. The system of claim 1, wherein the analysis unit determines the current and/or forecasted weather and/or environmental conditions further based on weather data or environmental data received from a third party.

5. The system of claim 1, wherein the sensor array is three-dimensional.

6. The system of claim 5, wherein the sensor array includes two weather and/or environmental sensors of a same type that are vertically aligned above a substantially same location of a surface of the venue.

7. The system of claim 2, wherein the at least one moveable weather and/or environmental sensor is mounted on an unmanned aerial vehicle.

8. A method for outputting a recommendation regarding weather and/or environmental conditions at a sporting event to a remote device, the method comprising:
receiving data indicative of past weather and/or environmental conditions;
receiving data indicative of outcomes of past sporting events, determining correlations between the past weather and/or environmental conditions and the outcomes of the past sporting events;
storing a mathematical model of atmosphere and a three-dimensional mathematical model of a playing surface of a venue;
receiving data indicative of the weather and/or environmental conditions from a sensor array comprising a plurality of weather and/or environmental sensors at a venue of the sporting event, wherein the plurality of weather and/or environmental sensors moves based on concentrations of participants and/or spectators, and wherein each of the plurality of weather and/or environmental sensor outputs information indicative of a real-time spatial location;
determining current and/or forecasted weather and/or environmental conditions at locations in the venue based on (i) the data indicative of the current weather and/or environmental conditions, (ii) the mathematical model of the atmosphere, and (iii) the three-dimensional mathematical model of the playing surface of the venue;
generating a recommendation for a modification to a play strategy for the sporting event based on the current and/or forecasted weather and/or environmental conditions and the correlations between the past weather and/or environmental conditions and outcomes of the past sporting events; and
outputting the recommendation to a communications network for transmittal to the remote device.

9. The method of claim 8, wherein at least one current weather or environmental condition at a location in the venue is determined based on data received from two or more of the weather and/or environmental sensors.

10. The method of claim 8, wherein different values of a same weather or environmental condition are determined at two different locations in the venue.

11. The method of claim 8, wherein the current and/or forecasted weather and/or environmental conditions are determined further based on weather data or environmental data received from a third party.

12. The method of claim 8, wherein the sensor array is three-dimensional.

13. The method of claim 12, wherein the sensor array includes two weather and/or environmental sensors of a same type that are vertically aligned above a substantially same location of a surface of the venue.

14. The method of claim 8, wherein the at least one moveable weather and/or environmental sensor is mounted on an unmanned aerial vehicle.

15. A non-transitory computer readable storage medium storing instructions that, when executed by a processor, cause a computing device to:
receive data indicative of past weather and/or environmental conditions;
receive data indicative of outcomes of past sporting events;
store a mathematical model of atmosphere and a three-dimensional mathematical model of a playing surface of a venue;
determine correlations between the past weather and/or environmental conditions and the outcomes of the past sporting events;
receive data indicative of the weather and/or environmental conditions from a sensor array comprising a plurality of weather and/or environmental sensors at a venue of the sporting event, wherein the plurality of weather and/or environmental sensors moves based on concentrations of participants and/or spectators, and wherein each of the plurality of weather and/or environmental sensor outputs information indicative of a real-time spatial location;
determine current and/or forecasted weather and/or environmental conditions at locations in the venue based on (i) the data indicative of the current weather and/or environmental conditions, (ii) the mathematical model of the atmosphere, and (iii) the three-dimensional mathematical model of the playing surface of the venue;
generate a recommendation for a modification to a play strategy for the sporting event based on the current and/or forecasted weather and/or environmental conditions and the correlations between the past weather and/or environmental conditions and outcomes of the past sporting events; and
output the recommendation to a communications network for transmittal to a remote device.

* * * * *